T. H. ALFREDS.
ANTICREEPING DEVICE FOR RAILROAD RAILS.
APPLICATION FILED JAN. 19, 1918.
Reissued Apr. 15, 1919. 14,632.
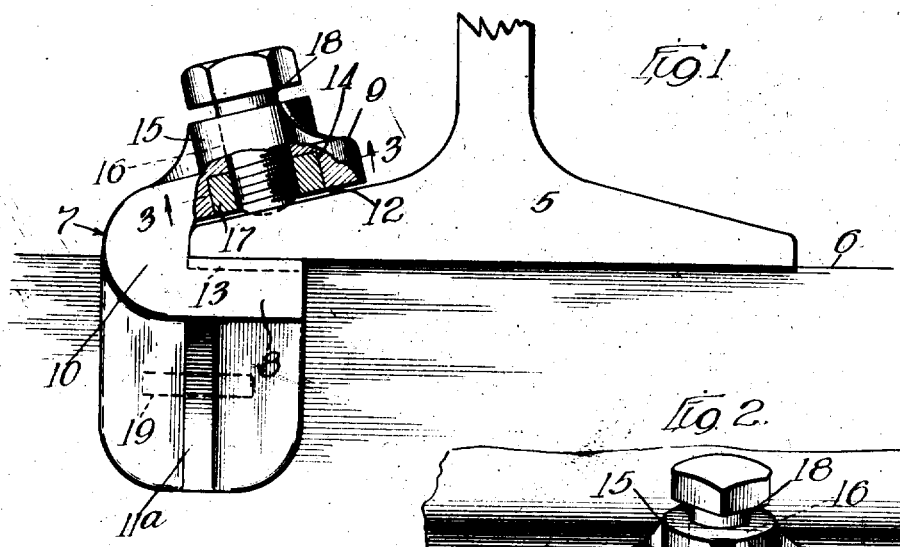
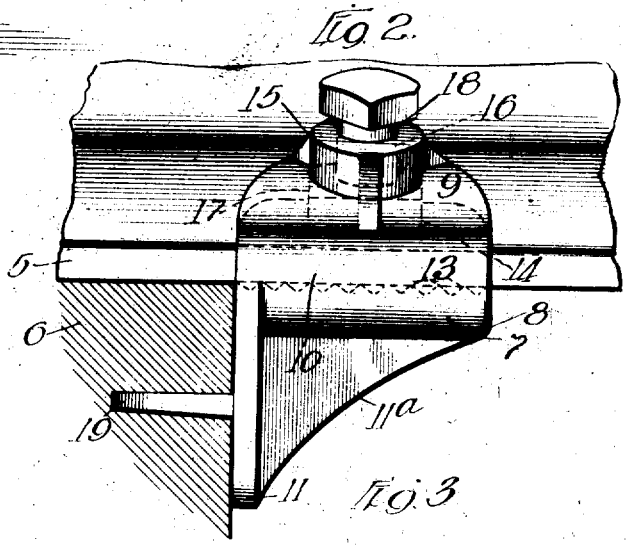
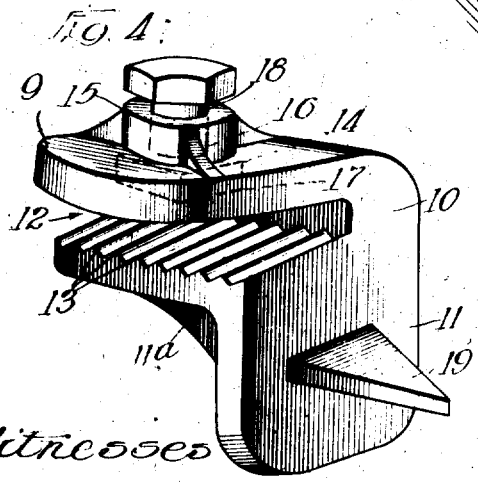
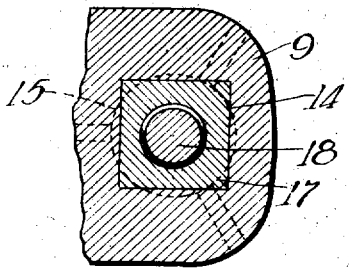
Witnesses
Harry R. L. White
W. P. Kilroy
Inventor:
Joris H. Alfreds
By Barnett & Kinney Atty

UNITED STATES PATENT OFFICE.

TORRIS H. ALFREDS, OF CHICAGO, ILLINOIS, ASSIGNOR TO THE P & M COMPANY, OF CHICAGO, ILLINOIS, A CORPORATION OF ILLINOIS.

ANTICREEPING DEVICE FOR RAILROAD-RAILS.

14,632. Specification of Reissued Letters Patent. Reissued Apr. 15, 1919.

Original No. 1,248,240, dated November 27, 1917, Serial No. 190,281, filed September 8, 1917. Application for reissue filed January 19, 1918. Serial No. 212,790.

*To all whom it may concern:*

Be it known that I, TORRIS H. ALFREDS, a citizen of the United States, and a resident of Chicago, in the county of Cook and State of Illinois, have invented certain new and useful Improvements in Anticreeping Devices for Railroad-Rails; and I do hereby declare that the following is a full, clear, and exact description thereof, reference being had to the accompanying drawings, and to the letters of reference marked thereon, which form a part of this specification.

This invention relates to improvements in anti-creeping devices for railroad rails and consists of the matters hereinafter described and more particularly pointed out in the appended claims.

One of the principal objects of the invention is to produce a device which is adapted to be attached to but one edge of a railroad rail by means which does not involve perforating, notching or cutting away any part of the rail; and which, when engaged with the rail in this manner, will so co-act with the associated tie as to prevent the creeping movement of the rail under the action of passing trains.

Another object of the invention is to provide such a device as can be made from a minimum of metal and yet provide a maximum in efficiency for its intended purpose.

A further object of the invention is to provide such a device as can be shipped as a single complete member, to the place of installation or attachment to the rail.

Still a further object of the invention is to provide such a device as can be secured to the tie adjacent the rail so as to provide a proper support for the device, in a position facilitating its attachment to the rail.

These objects, as well as the several advantages of my invention, will more fully appear as I proceed with my specification.

In the drawings:

Figure 1 illustrates an end view of my improved anti-creeping device as when attached upon a railroad rail.

Fig. 2 illustrates a side elevation view of the same.

Fig. 3 illustrates a horizontal, detail sectional view through the anti-creeping device, the plane of the section being indicated by the line 3—3 of Fig. 1.

Fig. 4 illustrates a perspective view of the device as it appears when ready to be applied in track.

Referring now in detail to that embodiment of my invention illustrated in the accompanying drawings, 5 indicates as a whole the base of a railroad rail; 6 indicates the usual cross tie upon which the rail rests in a familiar manner; and 7 indicates as a whole my improved anti-creeping device or rail anchor, as it is sometimes called.

The anti-creeping device consists of a block comprising a horizontally disposed bottom flange or member 8, of a suitable length, a top flange or member 9, which is inclined to the horizontal and which is substantially the same length as the bottom member, the said members being integrally connected along one edge as at the elbow or bend 10, and a vertically disposed flange 11 which depends from one end of the block and which is of a width equaling the combined width of said bottom member and said elbow. A bracing web 11ª connects said depending flange with the bottom surface of the bottom member 8.

The said top and bottom members together with the elbow or bend 10, define a horizontally disposed groove 12 which is adapted to receive one edge of the rail base so that said members 8 and 9 straddle the same when the device as a whole is applied in track.

On the top surface of the bottom member 8 which is preferably made of a width less than that of the top member 9, is formed a plurality of transversely extending, spaced ribs 13 which are adapted to engage with the bottom surface of the edge of the rail base, said ribs providing a better friction surface than a plain flat surface and assisting in reducing the amount of metal going into each individual block. In the bottom surface of the top member 9, which is inclined to extend in a plane parallel with the top inclined surface of the rail base, midway between its ends and nearer to the free edge thereof, is provided a rectangular recess 14. The device is locked to the rail by means of an adjustable device, preferably a set screw which engages one of the flat surfaces of the rail base, meaning by that the upper or lower surfaces of said rail base. The more convenient arrangement is to have the screw engage the upper surface.

With this in view the top surface of said top member, centrally above said recess, is provided with a boss 15 having a central aperture 16 which opens into the rectangular recess 14.

17 indicates a nut which is non-rotatively seated in the recess 14 with its bottom face flush with the bottom surface of the top member 9, said recess and nut in this instance being square in plan. While for economy the ordinary commercial nut is employed, it would be possible to use any perforated internally threaded piece of metal of a shape to be non-rotatably engaged with the body of the anti-creeper; and the term "nut" is used throughout the specification and claims with this understanding. The fit between said nut and recess is such that the nut will not drop from the recess after once in place. 18 indicates a set screw in the form of a relatively short bolt, which extends through the aperture in the boss 15 and has threaded engagement with and through the nut 17. The said bolt has the usual head at its top end for the application of a wrench or like device. 19 indicates a horizontally disposed, wedge-shaped lug which is made integral with the depending flange 11 on its outer face. This lug tapers horizontally to a point as shown in Fig. 4.

To apply the device in track, the top and bottom flanges 9 and 8 are placed upon the edge of the rail base so as to straddle the same with the depending flange 11 adjacent a tie and with the lug 19 in engagement with said tie. The outer end of the elbow 10 is struck with a sledge or maul in a manner to drive the said lug into the tie. By reason of the entering of the lug 19 into the tie, the block as a whole is suitably supported in operative position on the rail base without the aid of any hook for engagement with the other edge of the rail base, until the block is securely clamped to the rail, as will presently appear.

The usual track wrench is now brought into use by engaging its jaws upon the head of the setscrew or bolt 18. Said setscrew is rotated in the usual manner, threading through the nut 17 and engaging and indenting the top surface of the edge of the rail base, until further turning movement of said bolt is unnecessary. When the set screw is thus being tightened, it will tend to draw up the bottom flange or member into close engagement with the bottom of the rail base, thus securely locking the block as a whole to the rail against any independent movement, the one relative to the other. With the block thus fixed to the rail, any creeping movement of the rail for any reason whatsoever, is resisted by the engagement of the block as a whole with the tie.

Wave movement of the rail under the load of passing trains is resisted somewhat by reason of the entrance or penetration of the lug 19 into the tie and even though said lug breaks off from the flange 11, its primary function which is that of holding the block in position upon the rail so that the set screw can be tightened, has been fully performed. However, conditions in the road bed might sometimes be such that even the wave motion of the rail will be permanently resisted by said lug 19.

It is apparent that by locating the nut in the recess in the bottom surface of the top member 9, the expense and necessity for providing screw threads in the block as a whole, is eliminated, thus reducing the cost of manufacture, the screw and nut used being of a standard size and easily purchased in the open market. Again, if the block or body of the device is made of malleable iron, the metal commonly used for anticreeping devices, by placing an ordinary commercial nut or equivalent device in the recess as described, instead of threading the setscrew through the boss, the setscrew when tightened will have less tendency to strip the threading which it engages since the nut, being of wrought iron as is customary with ordinary commercial nuts, will be tougher than the malleable iron of which the body of the device is made.

It is apparent that each individual device can be made of less metal than other anticreepers having the same efficiency, because no hook for engaging the other edge of the rail base need be provided for, to support the block with reference to the rail, during its application thereto.

My improved anti-creeping device possesses other advantages in that, should there be a variation or irregularity in shape of the block, due to its warping or shrinking, as it is made in the foundry, this warping or shrinking will be of no moment because there is no companion engaging piece to be accommodated. Therefore, there is less waste of metal in the manufacture thereof. The device will also fit rails of slightly different rail base dimensions. Rails of different type differ in this respect and also rails of the same type, due to wearing of the rolls by which they are produced, and other causes.

As all of the parts of each individual device are fully exposed the workman applying the device in track can always see just what is going on and need not guess, as he must do when the devices comprise two parts which must be connected or interengaged beneath the rail, and furthermore, no ballast need be removed from between the ties to apply the device in track. The workman receives each device fully assembled and therefore wastes no time in mating up parts before applying the same in track. Each device readily accommodates for any variation in size of the rail base to which it is applied.

While in describing my invention I have referred to certain details in construction and form and in arrangement of parts, I do not wish to be limited thereto except as may be pointed out in the appended claims.

I claim:

1. A device of the kind described comprising a block adapted to engage against a tie, said block including top and bottom members adapted for engagement with one edge of the base of a rail, a setscrew adapted to bear against the rail, and means in one of said members providing a screw threaded engagement for said set screw.

2. A device of the kind described comprising a block adapted to engage against a tie, said block including top and bottom members adapted for engagement with one edge of the base of a rail, a nut non-rotatively engaged by one of said members and a set screw adapted to bear against the rail operatively engaged with said nut.

3. A device of the kind described comprising a block adapted to engage against a tie, said block including top and bottom members adapted for engagement with one edge of the base of a rail, one of said members having a recess therein, a nut in said recess, and a set screw threaded through said nut and adapted to engage the rail base.

4. A device of the kind described comprising a block adapted to engage against a tie, said block including top and bottom members adapted for engagement with one edge of the base of a rail, said top member having a recess in its bottom surface, a nut non-rotatively secured in said recess, and a set screw threaded through said nut and adapted to engage the top surface of the rail base.

5. A device of the kind described comprising a block adapted to engage against a tie, said block including top and bottom members adapted for engagement with the base of a rail, said top member having a recess in its bottom surface and an apertured boss on the top surface, a nut non-rotatively fixed in said recess, and a set screw extending through the aperture in said boss and threading through said nut and adapted to engage the top surface of the rail base.

6. A device of the kind described, comprising a block having top and bottom members adapted to be engaged upon the marginal part of a railroad rail, an upright flange made integral with said block and adapted to abut against a tie, said top member having a recess therein, a nut non-rotatively secured in said recess and a set screw having threaded engagement through said nut and being adapted to engage the top surface of the rail base.

7. A device of the kind described, comprising a block having top and bottom members adapted to be engaged upon the marginal part of a railroad rail, a vertically arranged flange depending from one end of said block and adapted to abut against a tie, said top member having a boss on its top surface and a recess in its bottom surface, a nut non-rotatively secured in said recess, and a set screw extending through said boss and having threaded engagement in said nut and being adapted to engage the top surface of the rail base.

8. A device of the kind described, comprising a block having top and bottom members adapted to be engaged upon the marginal part of a rail base, and a depending flange adapted to abut against a tie, said top member having a recess in its bottom surface and said bottom member having a plurality of ribs on its top surface, a nut non-rotatively secured in said recess, and a bolt having threaded engagement through said nut and adapted to engage the rail base.

9. A device of the kind described, comprising a block having top and bottom members adapted to be engaged upon the marginal part of a rail base, and a depending flange adapted to abut against a tie, a tie entering lug on said flange, said top member having a recess in its bottom surface, a nut in said recess, and a set screw threaded through said nut and adapted to engage the top surface of the rail base.

10. A device of the kind described, comprising a block adapted to engage a rail and to occupy a place entirely at one side of a tie supporting said rail having top and bottom members for engagement with the edge of the rail base, said block including a depending flange to engage with said tie, a prong on said flange which is adapted to enter the side of the tie and support said block thereon, and means associated with said top member for preventing movement of the rail relative to said block.

11. A device of the kind described, comprising a block having top and bottom members adapted for engagement upon the edge of a rail base, said block including a depending flange adapted to engage with a tie, a tie entering lug on said flange, said top member having a recess in its bottom surface, a nut non-rotatively secured in said recess, and a revoluble threaded element extending through and engaged with said nut and adapted to prevent movement of the rail relative to said block.

12. A device of the kind described adapted to engage one side of the rail only, comprising a block having top and bottom members adapted for engagement upon the edge of the base of a rail, a depending flange on one end of the block, adapted to abut against a tie, a tie entering lug on said flange, and means associated with the top member and engaging with the upper surface of the rail base to lock said block to said rail base.

13. A device of the kind described adapted to engage one side of the rail only, comprising a block having top and bottom members adapted for engagement upon the edge of the base of a rail, a depending flange at one end of said block adapted to abut against a tie, said top member being greater in width than said bottom member, and a separate fastening device associated with said top member and engaging with the upper surface of the rail base for locking said block to the rail base.

14. A device of the kind described adapted to engage one side of the rail only, comprising a block having top and bottom members adapted for engagement upon the edge of the base of a rail, a depending flange at one end of said block adapted to abut against a tie, said top member being greater in width than said bottom member, and a setscrew associated with said top member for locking said block to said rail base.

15. A device of the kind described adapted to engage one side of the rail only, comprising a block having top and bottom members adapted for engagement upon the edge of the base of a rail, a depending flange at one end of said block adapted to abut against a tie, said top member being greater in width than said bottom member and having a recess in its bottom surface, a nut secured in said recess, and a set screw extending through said top member and having threaded engagement with the nut to lock said block to said rail base.

16. A device of the kind described, comprising an inclined top member and a horizontally disposed bottom member integrally connected together along one edge, a vertically arranged flange depending from one end of said bottom member, a brace web connecting said flange with said bottom member, said top member being greater in width than said bottom member, and having an apertured boss on its top surface and a rectangular recess in its bottom surface, the aperture in said boss opening into said recess, a nut in said recess, and a set screw extending through said boss and nut.

17. In combination with a railway tie and a rail resting thereon, a block adapted to engage said tie and having top and bottom members adapted for engagement upon an edge of the base of said rail, said bottom member being of a width less than that of said rail base, and a set screw engaging with one of the flat surfaces of the rail base for locking the block to the base of said rail.

18. An anti-creeping device for a railroad rail adapted to engage with one side of the rail only comprising a recessed block to extend over one edge of the rail base, and a threaded element associated therewith adapted to take a biting hold on the surface of the rail base to lock said block thereto.

19. An anti-creeping device for a railroad rail comprising a block recessed to form a jaw to embrace one edge of the base of the rail, the vertical dimensions of which jaw are greater than the corresponding dimensions of the portion of the rail base embraced thereby, and means for securing said block to the rail so that the block will move with relation to the cross tie during a retrograde movement of the rail comprising a separate fastening device associated with said block which engages one of the flat surfaces of the rail base for making tight the engagement of the jaw with the rail base.

20. An anti-creeping device for a railroad rail comprising a block recessed to form a jaw to embrace one edge only of the base of the rail and means for securing said block to the rail so that the block will move with relation to the cross tie during a retrograde movement of the rail comprising a separate fastening device associated with said block a set screw which engages one of the flat surfaces of the rail base for making tight the engagement of the jaw with the rail base.

21. An anti-creeping device adapted to engage with one side of the rail only comprising a block recessed to form a jaw to embrace one edge of the base of the rail, and a set screw which engages one of the flat surfaces of the rail base for making tight the engagement of the jaw with the rail base.

22. An anti-creeping device for a railroad rail comprising a rail engaging member and means for locking said member to the rail comprising an adjusting screw and a perforated, internally threaded member nonrotatably associated with the rail engaging member which provides a threading engagable by said screw.

TORRIS H. ALFREDS.